United States Patent Office 3,293,274
Patented Dec. 20, 1966

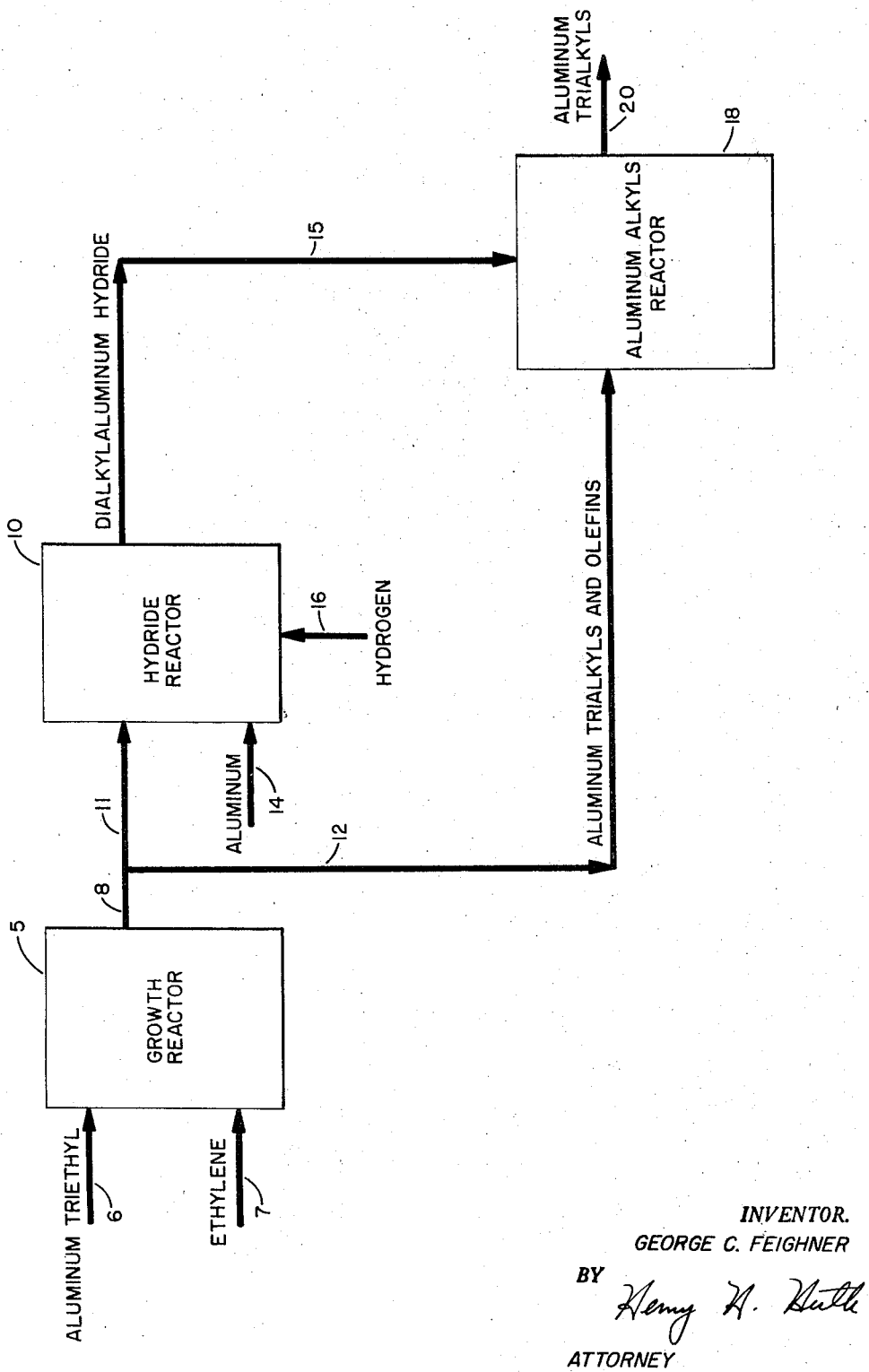

3,293,274
PROCESS FOR PREPARATION OF HIGH MOLECULAR WEIGHT ALUMINUM ALKYLS
George C. Feighner, Ponca City, Okla., assignor to Continental Oil Company, Ponca City, Okla., a corporation of Oklahoma
Filed June 19, 1961, Ser. No. 117,891
6 Claims. (Cl. 260—448)

This invention relates to a method of utilizing the olefin by-product which is formed in the growth reaction to produce additional quantities of desired product.

The growth reaction involves the reaction of aluminum triethyl with ethylene to produce high molecular weight aluminum trialkyl product. Unfortunately, high molecular weight olefins are also produced, and it becomes a costly procedure to separate the olefins from the product, not to mention the loss of useful product which is represented by the olefin. The high molecular weight aluminum trialkyls are useful in producing alcohols by the two-step operation of first oxidizing them to the aluminum trialkoxides and then hydrolyzing the alkoxide to the alcohols. The olefin represents loss of alcohol product, and it would be very important commercially to find a method of utilizing the olefins to produce additional alcohol product.

Thus, an object of this invention is to provide a method of utilizing the olefin by-product in the growth reaction to make additional alcohol product from the growth reaction product.

Another object of this invention is to convert the olefin by-product of the growth reaction to aluminum trialkyl.

Other objects and advantages will become apparent from the following description and explanation thereof.

In its broad aspect, the present invention is directed to the reaction of high molecular weight aluminum trialkyls containing olefins with hydrogen and aluminum, whereby a portion of the aluminum trialkyl is converted to aluminum dialkyl hydride (intermediate) which in turn reacts with olefin to produce aluminum trialkyl.

In another aspect, the present invention is concerned with dividing a high molecular weight aluminum trialkyl product containing olefins into a first and second fraction, passing the first fraction into a hydriding zone where aluminum and hydrogen are reacted with aluminum trialkyl to form aluminum dialkyl hydride, and then passing the effluent from the hydriding zone and the second fraction of aluminum trialkyl into a second reaction zone where the hydride and olefin react to form aluminum trialkyl.

In the well known growth reaction low molecular weight trialkylaluminum compounds in which the alkyl groups contain about 2 to 4 carbon atoms are reacted with mono-1-olefins containing about 2 to 4 carbon atoms, preferably ethylene, to produce a growth product in which the alkyl groups increase in length. The reaction is conducted at a temperature of about 65° to 155° C., preferably about 90° to 120° C., and at a pressure of about 200 to 5,000 p.s.i.g., and preferably about 1,000 to 3,500 p.s.i.g. A diluent may be present, such as an aliphatic or aromatic hydrocarbon. Unfortunately, olefins are produced as by-products in the reaction which represent a loss from the standpoint of the ultimate product into which the growth product is converted. In general the olefin comprises about 6 to 10 weight percent of the growth product or high molecular weight aluminum trialkyl and contains about 4 to 30 carbon atoms in the molecule.

The high molecular weight aluminum trialkyls have alkyl radicals which contain about 4 to about 30 carbon atoms. When the process is carried out in two stages at least a portion of the high molecular weight aluminum trialkyl is reacted with aluminum and hydrogen to form aluminum dialkyl hydride in accordance with the following equation:

(1) 

wherein R is the alkyl radical defined above.

The "hydride" reaction is conducted at a temperature of about 90 to 150° C., preferably about 105 to 125° C., and ordinarily at a pressure of about 500 to 3,000 p.s.i.g., preferably about 1,000 to 1,500 p.s.i.g. Stoichiometrically, two moles of the aluminum trialkyl reacts with one mole of aluminum and one and one-half moles of hydrogen. It is not necessary that the aluminum trialkyl be completely converted to dialkylaluminum hydride. It may be desirable, for example, to achieve a higher reaction rate, to convert only a part of the aluminum alkyl to aluminum dialkyl hydrides. If so, lesser amounts of aluminum and hydrogen, that is, less than stoichiometric can be employed in the reaction. The aluminum is employed in subdivided form to provide maximum surface area consistent with optimum reaction rates. A liquid medium can also be used to provide the reactants with a better opportunity for contact with one another. The liquid medium is nonreactive with the reactants nor may it interfere substantially with the reaction. For this purpose, a liquid medium of the hydrocarbon type is preferred, particularly the aliphatic and aromatic hydrocarbons, such as decane, kerosene, gas oil, naphtha, xylene, toluene, and the like. The liquid medium may be present in the reaction in an amount of about 10 to 90 parts by volume per part of reactants including the aluminum trialkyl and aluminum. The hydride reaction is carried out for a period of about 0.1 to 10 hours before separation of the desired hydride product is undertaken.

Following the hydride reaction, the aluminum dialkyl hydride is reacted with the olefin. The olefin can be utilized as a separate fraction and derived from any source; or the aluminum trialkyl product containing olefin as by-product can be used as the reactant. The reaction between the hydride and the olefin is accomplished in the following manner:

(2) 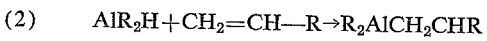

wherein R has the same meaning as given in Equation 1 above. The reaction between the hydride and the olefin requires equimolar quantities on a stoichiometric basis, and in practice the reaction is essentially quantitative. The reaction is conducted at a temperature of about 60 to 150° C., preferably about 90 to 115° C. and ordnarily at atmospheric pressure. It is believed that higher temperatures tend to favor the equilibrium in the direction of the reactants; consequently, where high yields become paramount in importance, the temperature is maintained relatively low, although longer reaction periods may be involved to attain a desired level of conversion. The period of reaction varies from about 10 minutes to 6 hours; however, as indicated, it may vary beyond the range just given. During the course of the reaction, it is preferable to maintain a protective atmosphere over the reaction mixture. The gaseous material employed is inert and from the economic point of view is preferably inexpensive. The gaseous material can be methane, ethane, nitrogen, argon, etc.

The preceding discussion has been directed to the preferred embodiment of the invention wherein the formation of the aluminum dialkyl hydride and the reaction of said aluminum dialkyl hydride with olefin are carried out in separate steps. The two-step process is preferred, since the reaction conditions which are optimum for each step can be more readily maintained. It is also within the scope of the invention, however, to carry out the "hydride" reaction and the reaction of the hydride with olefin in a single step. When this is done, dialkylaluminum hydride is an intermediate product which is consumed substantially as formed in the conversion of olefin to aluminum dialkyl. The combined single-step process is preferably conducted at a temperature between about 105 and 115° C. The pressure which is due almost entirely to partial pressure of hydrogen will be the same as in the "hydride" reaction, namely, about 500 to 3,000 p.s.i.g. and preferably about 1,000 to 1,500 p.s.i.g.

The aluminum trialkyls of high molecular weight are useful for producing alcohols. The aluminum trialkyls are first oxidized with oxygen in the pure form or as air to produce the aluminum trialkoxide. This is a well-known reaction and will be readily understood by those skilled in the art. In general, the aluminum trialkyl can be combined with a diluent such as an aromatic or aliphatic hydrocarbon, e.g., toluene, xylene, decane, nonane, kerosene, naphtha, and the like and then the oxygen containing gas passed therethrough. The temperature of reaction is between about 20° and 100° C., preferably about 20 to 35° C., and at a pressure of about 10 to 60 p.s.i.g., preferably about 30 to 40 p.s.i.g. The reaction requires about 2 to 6 hours.

The aluminum trialkoxide is then converted into the alcohol by the well-known hydrolysis reaction. The hydrolyzing agent can be, for example, a mineral acid, e.g., sulfuric acid, water, steam or a base such as sodium hydroxide, potassium hydroxide and the like. The hydrolysis reaction is conducted at a temperature of about 25° to 125° C. The hydrolyzing agent is used in an amount of about 2 to 200 percent in excess of the stoichiometric quantity.

To provide a fuller understanding of the present invention, the following examples are given.

*Example 1*

300 grams of the growth product described in Table I, 24 grams of aluminum, which had been ball milled for 23 hours, and 111 grams of undecane were placed in a one-liter autoclave. The autoclave was filled with hydrogen to provide a pressure of about 2,000 p.s.i.g. The reaction was carried out at 250° F. for a period of 3 hours. The resulting aluminum dialkyl hydride was separated from the unreacted aluminum to the greatest extent possible.

The hydride obtained by the procedure of Example 1 was reacted with the growth product shown in Table I and which contained about 10 percent olefins ranging from about 4 to 20 in total carbon atoms. The reaction between the hydride and the olefin containing growth product was conducted at various conditions to determine their effects on the ultimate yield of alcohol after it is subjected to oxidation and hydrolysis. One sample of growth product which had not been treated to produce hydride was also oxidized and hydrolyzed to produce alcohols to provide a basis of comparison. The results are given in Table II hereinbelow.

The reaction between the hydride and the olefins in the growth product were done by adding the reactant materials to a flask, and a nitrogen blanket was maintained on the reaction mass while being stirred gently. The mass was kept at the desired temperature during the time that it was being stirred.

The product from the reaction of growth product and hydride was oxidized with air at a temperature of 30° C. The product was diluted with an equal volume of toluene and stirred all the time that air was passed upwardly through it.

TABLE II

| Run No. | Weight Hydride (gram) | Weight Growth Product (gram) | Percent Hydride Based on Olefin | Reaction Temp., °C. | Reaction Period, Hour | Charge to Oxidation (gram) | Toluene (cc.) | Oxidation Temp., °C. | Oxidation Time, Hour | Vol. of $O^2$ Uptake (cc.) | Hydroxyl Number of Oxidation Product | Yield of Alcohol Based on Al in Growth Product |
|---|---|---|---|---|---|---|---|---|---|---|---|---|
| 1 | | | | | | 16.65 | 15 | 30 | 4.0 | 895 | 0.40 | 71.2 |
| 2 | 3.9 | 32.4 | 50 | 125 | 1.5 | 16.82 | 15 | 30 | 3.2 | 1,000 | 0.44 | 77.4 |
| 3 | 6.23 | 29.65 | 75 | 125 | 1.5 | 16.66 | 15 | 30 | 5.5 | 950 | 0.44 | 77.7 |
| 4 | 8.15 | 33.12 | 100 | 125 | 1.5 | 16.75 | 15 | 30 | 4.2 | 995 | 0.43 | 76.1 |
| 5 | 8.2 | 33.3 | 100 | 85 | 6 | 16.80 | 15 | 30 | 4.0 | 1,060 | 0.45 | 78.8 |
| 6 | 8.2 | 33.3 | 100 | 105 | 6 | 16.96 | 15 | 30 | 4.5 | 1,010 | 0.455 | 80.5 |
| 7 | 11.9 | 31.65 | 150 | 125 | 1.5 | 16.67 | 15 | 30 | 5.0 | 950 | 0.435 | 76.0 |

Aluminum alkyl growth product was prepared by reacting aluminum triethyl dissolved in an equal volume of kerosene with ethylene at a temperature of 120° C. and a pressure of 1,500 p.s.i.g. for about 3 hours. The growth product obtained had a composition as shown in Table I.

TABLE I.—ALKYL DISTRIBUTION

| Alkyl | Mole Percent | Weight Percent |
|---|---|---|
| $C_2$ | 1.23 | 0.24 |
| $C_4$ | 5.40 | 2.05 |
| $C_6$ | 11.88 | 6.67 |
| $C_8$ | 17.43 | 12.97 |
| $C_{10}$ | 19.17 | 17.17 |
| $C_{12}$ | 16.87 | 18.72 |
| $C_{14}$ | 12.37 | 15.99 |
| $C_{16}$ | 7.78 | 11.47 |
| $C_{18}$ | 4.28 | 7.08 |
| $C_{20}$ | 2.09 | 3.85 |
| $C_{22}$ | 0.92 | 1.86 |
| $C_{24}$ | 0.37 | 0.81 |
| $C_{26}$ | 0.13 | 0.32 |
| $C_{28}$ | 0.05 | 0.12 |
| $C_{30}$ | 0.01 | 0.04 |

The results in Table II demonstrate the significant advantage in converting olefins which are present in the growth product to aluminum trialkyls. It will be noted that the percent yield of alcohol increased in each case where the hydride was reacted with the olefin in the growth product. Further, the alcohol yield (based on original aluminum trialkyl charged) increased as the temperature of reaction between the hydride and olefin decreased.

The accompanying drawing which forms a part of this specification illustrates the co-operation between the various steps of the process. In the drawing, aluminum triethyl is fed to the reactor 5 at the rate of 1 mole per hour via line 6. Ethylene is also charged at the rate of 14.2 moles per hour via line 7. The diluent used in reactor 5 is kerosene, which is present in an amount of 50 volume percent. The temperature in reactor 5 is about 120° C. and at a pressure of about 1,500 p.s.i.g. The growth product is discharged from the reactor 5 through line 8 before it is divided so that about 11 percent of it is fed to a reactor 10 via line 11 and the remaining part is passed through line 12.

In reactor 10, the growth product is combined with subdivided aluminum which is fed therein through line 14 at the rate of 0.11 mole per hour. Similarly, hydrogen is passed into the reactor 10 via line 16 at the rate of 0.165 mole/hour. Aluminum dialkyl hydride is produced in the reactor where the temperature is about 120° C. and the pressure is about 1,500 p.s.i.g. The reaction period is about 3 hours. The product leaves reactor 10 through line 15 and thence it is charged into a reactor 18 where it is combined with the remaining growth product which is fed thereto by means of line 12. The olefin in the growth product is about 7.5 weight percent of the same, and the hydride fed to the reactor is enough in amount to react with all of it. The hydride and olefin are reacted at a temperature of about 105° C. and at a pressure of about atmospheric. The reaction occurs for about 6 hours, and thereafter the product is discharged therefrom through line 20 at the rate of 1.11 moles of $AlR_3$ per hour.

It can be seen that the various steps co-operate with each other to provide the beneficial result of the present invention. Part of the growth product is utilized to prepare the hydride, which in turn is reacted with the olefin to produce additional quantity of aluminum trialkyl. The net result is that the olefin is converted to a useful product, namely, the alcohol at an attractive economical cost.

Having thus described the invention by providing specific examples thereof, it is to be understood that no undue limitations or restrictions are to be drawn by reason thereof and that many variations and modifications are within the scope of the invention.

I claim:
1. In a process where a low molecular weight aluminum trialkyl is reacted with a low molecular weight mono-1-olefin to produce a reaction product comprising high molecular weight aluminum trialkyls and high molecular weight olefins, the improvement which comprises reacting said reaction product with aluminum and hydrogen, whereby a portion of the aluminum trialkyl is converted to aluminum dialkyl hydride which then reacts with olefin to produce aluminum trialkyl and recovering high molecular weight aluminum trialkyl product reduced in olefin content.

2. In a process where a low molecular weight aluminum trialkyl is reacted with a low molecular weight mono-1-olefin to produce a first reaction product comprising high molecular weight aluminum trialkyls and high molecular weight olefins, the steps comprising taking a portion of the reaction product and reacting the same with aluminum and hydrogen to produce a second reaction product containing aluminum dialkyl hydride, combining the second reaction product with the remainder of the first reaction product and reacting the aluminum dialkyl hydride and olefins to produce aluminum trialkyls.

3. The process of claim 2 wherein the amount of aluminum dialkyl hydride produced is sufficient to react with all the olefins in the remaining first reaction product.

4. The process of claim 3 wherein the low molecular weight aluminum trialkyl is aluminum triethyl and the mono-1-olefin is ethylene.

5. The process of claim 4 wherein the aluminum trialkyl, aluminum and hydrogen are reacted at a temperature of about 90 to 150° C. and at a pressure of about 500 to 3000 p.s.i.g.

6. The process of claim 5 wherein the olefins and aluminum dialkyl hydride are reacted at a temperature of about 60 to 150° C. and at about atmospheric pressure.

References Cited by the Examiner
UNITED STATES PATENTS

| | | | |
|---|---|---|---|
| 2,863,895 | 12/1958 | Kishenbaum et al. | 260—448 |
| 2,863,896 | 12/1958 | Johnson | 260—448 |
| 2,892,858 | 6/1959 | Ziegler | 260—448 |
| 2,921,876 | 1/1960 | Dobratz. | |
| 2,943,102 | 6/1960 | Balhoff | 260—448 |
| 3,100,786 | 8/1963 | Fernald | 260—448 |
| 3,207,773 | 9/1965 | Ziegler et al. | 260—448 |

TOBIAS E. LEVOW, *Primary Examiner.*